United States Patent
Gallo

[15] 3,699,906
[45] Oct. 24, 1972

[54] POLLUTION CONTROL SYSTEM

[72] Inventor: Carl Gallo, Scarsdale, N.Y.

[73] Assignee: American Pollution Control Corporation, Scarsdale, N.Y.

[22] Filed: March 23, 1971

[21] Appl. No.: 127,171

[52] U.S. Cl....................................110/8 E, 110/9 E
[51] Int. Cl................................................F23g 5/10
[58] Field of Search....110/8 R, 8 E, 18 R, 18 E, 9 R, 110/9 E

[56] References Cited

UNITED STATES PATENTS

| | | | |
|---|---|---|---|
| 2,279,578 | 4/1942 | Martin | 110/9 |
| 2,932,713 | 4/1960 | Powers | 110/8 X |
| 3,357,376 | 12/1967 | Miller | 110/8 |
| 3,098,144 | 7/1963 | Dale | 110/9 |
| 3,251,070 | 5/1966 | Blankenship | 110/9 |
| 3,527,178 | 9/1970 | Southwick | 110/8 |

Primary Examiner—Kenneth W. Sprague
Attorney—Sparrow and Sparrow

[57] ABSTRACT

A pollution control system in which continuous-wave radio-frequency generator is coupled to a radio-frequency power amplifier. The power amplifier is electrically coupled to an inductor surrounding a crucible made of sintered metal compounds or alloyed metals. The crucible is resistive to radio frequency currents and converts the electrical energy of the inductor into heat for converting matter within the crucible.

2 Claims, 3 Drawing Figures

INVENTOR.
CARL GALLO
BY
SPARROW AND SPARROW
ATTORNEYS

POLLUTION CONTROL SYSTEM

BACKGROUND OF THE INVENTION

Raw human waste is a principal pollutant. Among the contents of raw human waste are: 1) undigested material such as meat ligaments; 2) undigested fats and starch; 3) materials which cannot be digested; 4) bacteriological decomposition waste products; 5) mucus and cells discarded by the intestinal tract; 6) bile and other pigments; 7) trace elements of inorganic salts of sodium, potassium, calcium, magnesium, and iron; 8) bacteria; 9) gases which arise mainly from bacterial action; 10) water; and 11) urine.

It has been established that over 95 percent of all human waste is composed of organic matter and water. Further, organic matter including dangerous deadly bacteria can be reduced to their inorganic elements, which are readily soluble in water, by the application of heat. The higher the temperature, the shorter the reduction time. The water content may be driven off in the form of steam.

The present system of treating sewage was developed approximately 100 years ago, and it has changed little over the past century. In the conventional sewage treating system, solid human waste and urine are mixed with drinking water at the toilet bowl, and the resultant mixture is passed thru an elaborate and complex piping network to its final destination—the central disposal system. There, the sewage is sent into large settling tanks where the solid human waste sinks to the bottom of the tank and the liquid rises to the top. The liquid waste is then pumped into the local waterway. The remaining solid human waste, often called "black sludge," is usually allowed to remain in the tank for treatment. This treatment process is slow and complex. "Friendly" microbe-organisms in the solid human waste break down the solid until a "safe" level has been attained. At that point, the "black sludge," is pumped into the local waterway to mix with other waste.

Any sewage disposal system of this conventional design is limited by the rate of flow, volume capacity of the system, and the time cycle of the treatment. When the capacity of the system has been reached, the overflow of raw human waste is bypassed around the sewage disposal system and pumped into the already overburdened local waterway. During the same time interval, and in areas where the water is non-saline, some of the polluted water is pumped back into water purification plants, where the water is treated at considerable expense. The treated water is then passed thru the same cycle to be polluted again.

The time cycle for sewage treatment, from a practical point of view, varies sharply, and is in general inversely related to population density. Thus, in larger cities, sewage receives little or no treatment for the following reasons: 1) The conventional system is inefficient, since too many operations are required to achieve the end result; 2) Sewage disposal systems which service large cities are completely unable to process the enormous volume of sewage which must be safely disposed of each day; 3) There is no way to dispose of the highly toxic "black sludge" any longer, by virtue of bacteriological content. Substantially all of the inland and peripheral ocean areas of the United States, Europe, and Asia, and other continental areas have been considerably contaminated through the use of the conventional disposal system, or the lack of any system at all; 4) The conventional system is destructive to the ecology, and cannot be indefinitely maintained.

The human body is composed mainly of water, and for this reason, it is important to examine closely the drinking water. Such an examination reveals that the source of water at the watersheds (when available) is relatively pure. However, as the water passes through the distribution system, it becomes increasingly impure because it is mixed with polluted water and chemical agents, in an attempt to control the pollution level. By the time that the water reaches the spigot, it is no longer potable water but is, instead, a chemical solution composed mainly of water, chlorine, complex chemical and biological substances, living bacteria, and organic and inorganic salts. The composition will vary, particularly in areas which have no watershed. In any case, it is polluted water which flows from the spigot, and generally, the closer to the city, the higher the degree of toxicity of pollution.

Polluted drinking water carries every known germ, virus, and chemical agent capable of causing illness of varying types and degrees, or death, to the user. For example, the bacteria of amebic dysentery are always present in polluted water. These are present in the form of the cysts of the *Entameba histolytica* which will live in water up to several weeks. Chlorination of water will sterilize it, from the viewpoint of bacteria. However, it takes 100 times as much chlorine to kill the cysts of the *Entameba histolytica* (amebic dysentery), as it does to kill bacteria in water. In fact, the addition of this quantity of chlorine would make the water unfit for drinking. Consequently, whenever water is contaminated with *Entameba histolytica*, the only way to make such water safe is to boil it. Since this is not feasible for any city water supply, the solution to the problem resides in preventing the pollution of water in the first place.

Commercial waste is also a very significant contributor to environmental pollution. The packaging of food is an important factor in the production of commercial waste, and results from the following; 1) Rapid population growth; 2) The accompanying growth of the super-market method of food sale and distribution; 3) The need for standard packaging, whether by weight or volume to reduce the cost of distribution; 4) Sanitary and health considerations which demand that the handling of food be kept to a minimum; 5) The benefits of mass purchasing and distribution which are passed on to the consumer in the form of lower prices and increased convenience; 6) A wider variety of foods and goods are made available to the consumer through packaging methods.

Such packaging of food is, however, accomplished not without considerable cost. For example, a chain of 480 supermarkets spent in excess of $750,000 during 1970 for on-site incineration of cartons, wrappings, and spoiled foods. Each of the supermarkets in the survey had its own on-site incineration unit. The waste is usually packed up and burnt towards evening. As a result, food is contributed towards the rat population during the day and air pollution is obtained at night.

Accordingly, it is an object of the present invention to provide a pollution control system for the treatment of commercial waste. It is also an object of the present invention to reduce raw human waste from its organic state to an inert inorganic state. It is further an object of the present invention that the raw human waste be converted at the source, or the toilet bowl. It is a specific object of the present invention to convert the raw human waste and the commercial waste in an efficient and economical manner.

SUMMARY OF THE INVENTION

With the arrangement of the present invention, the raw human waste is reduced from its organic state to an inert, inorganic state at the toilet bowl. A heat-producing crucible is contained within the toilet bowl. Upon activation of the pollution control system of the present invention, a controlled burst of high energy is generated at the crucible in the form of heat. The heat reduces effectively the raw human waste from its organic state to an inert inorganic state. The residue is a small fraction of the original mass and is readily dissolved in water during the flushing cycle. The residue can then be passed to the sewer drain after flushing.

The pollution control system of the present invention will operate with the separate water tank as used in most private homes, and also with flow meter systems which are generally used in apartment dwellings. The pollution control system, furthermore, will operate in boats, aircraft, ocean-going steam and motor vessels, and in submarines. Whereas 5 gallons of drinking water are generally needed to flush the conventional toilet, the pollution control system of the present invention requires approximately only 1 gallon for flushing. The output of the conventional toilet is raw human waste which must be treated, whereas the output of the pollution control system of the present invention is mostly water containing traces of inorganic slats which are harmless and require no further treatment. A federal law now requires that all private and pleasure boats possess pollution control systems before such vessels may be operated.

In the treatment of commercial waste, the waste materials are compacted, on-site to a fraction (10-15 percent), of the original mass. The resultant compacted mass which may be rectangular shape, is mostly organic and is relatively small and manageable. The compacted mass is then reinserted into a crucible of the pollution control system of the present invention and is reduced to a small fraction of its original mass, through the application of intense heat.

The pollution control system of the present invention for the treatment of commercial waste is continuous, and there is no accumulation of waste to be burned at the end of the day. As a result, health hazards are reduced by eliminating a major source of food for rats. The incineration costs to the supermarket are thereby reduced and the economy may be passed on to the consumer in the form of savings. The individual supermarket, moreover, can thus have more working space, since the waste is compacted and reduced immediately.

BRIEF DESCRIPTION OF THE DRAWINGS

In the following description and in the claims; parts will be identified by specific names for convenience, but such names are intended to be as generic in their application to similar parts as the art will permit. Like reference characters denote like parts in the several figures of the drawing, in which:

DESCRIPTION OF THE PREFERRED EMBODIMENTS

Figure 1:
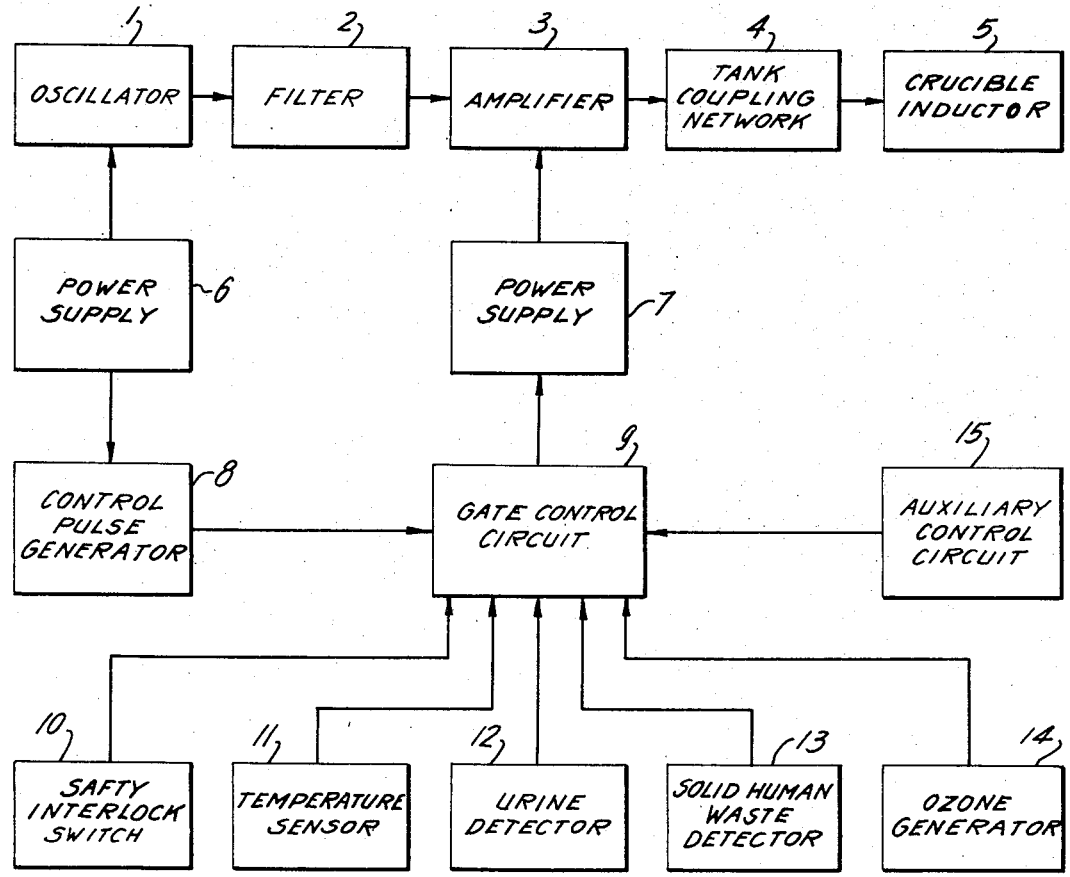
FIG. 1 is a block diagram of a pollution control arrangement for processing of raw human waste, in accordance with the present invention.

Referring to the drawings and in particular to FIG. 1, an Oscillator 1 is provided with power from a low voltage Power Supply 6. The output of the Oscillator 1 is applied to a Filter Network 2 for the purpose of eliminating harmonics from the output signal of the Oscillator, which may interfere with television and radio reception. A Power Amplifier 3 connected to the output of the Filter 2 may be in the form of power transistors or ceramic tetrodes. The Power Amplifier 3 is fed from the Power Supply 7, and supplies an amplified oscillating signal to a tank coupling Network 4. The output of the Network 4 is applied to an Inductor 5 on the crucible in which the substance to be converted through heat is contained. A gated Control Circuit 9 determines the time instant at which the Amplifier 3 supplies energy to the Network 4 and hence Crucible Inductor 5. The Control Circuit 9 may be in the form of a transistor or thyratron type of device. The gated Control Circuit 9, furthermore, is actuated by a Control Pulse Generator 8, which transmits a pulse of predetermined width or duration. A Safety Interlock Switch 10 prevents the system from operating if the seat cover associated with the toilet bowl is not closed. A temperature Sensor 11 measures the crucible temperature, and inhibits an output pulse signal from the gate Control Circuit 9 when the crucible temperature exceeds a predetermined limit. When the crucible temperature drops below this predetermined limit, the system recycles automatically. A Urine Detector 12 measures the level of acidity of the bowl contents to determine whether the system operates on liquid waste only, and actuates the Gate Control Circuit 9 accordingly. The quantity of hydrogen sulphide gas which may be present and which accompanies solid human waste, is detected by the solid human waste detector. An Ozone Generator 14 serves as an air purifier and fan. Auxiliary Control Circuits 15 operate electrically controlled water valves at the beginning, and the crucible wash and vent processes.

In operation of the pollution control system, in accordance with with present invention, the seat cover of the toilet bowl is closed after the deposition of human waste therein. The closure of the seat cover, closes the Interlock Switch 10. The Sensors 12 and 13, thereafter, determine whether the waste is composed of urine or raw human waste which contains both urine and solid human waste. If only urine is present, it is heated to a point sufficient to destroy bacteria and uric acid. After the urine has been thus heated, an electrically operated valve is activated to allow the resultant liquid to flow down the drain.

When the Sensor 13 detects the presence of solid human waste, a short time is allowed for the solid human waste to settle and to separate from the urine. The urine is drawn off mechanically to be treated separately. After the settling of the solid human waste, the Gated Control Circuit 9 applies electrical signals to the Power Supplies 6 and 7 for the purpose of transmitting an amplified Power burst of energy from the Oscillator 1 to the crucible Inductor 5. With the Inductor Coil 5 energized in this manner, the contents of the crucible are converted to inorganic matter. Timing circuits within the Control Devices 15 allow the crucible to cool after which electrically operated valves are opened to allow the water to flush the crucible and transfer the contents of the crucible to the drain. The liquid products are treated separately at lower temperatures and in a separate operation to prevent the generation of excessive steam which would have to be cooled and condensed. A stainless steel sleeve may be inserted into the crucible, in view of the presence of corrosive gases and chemicals during the first cycle.

Figure 2:
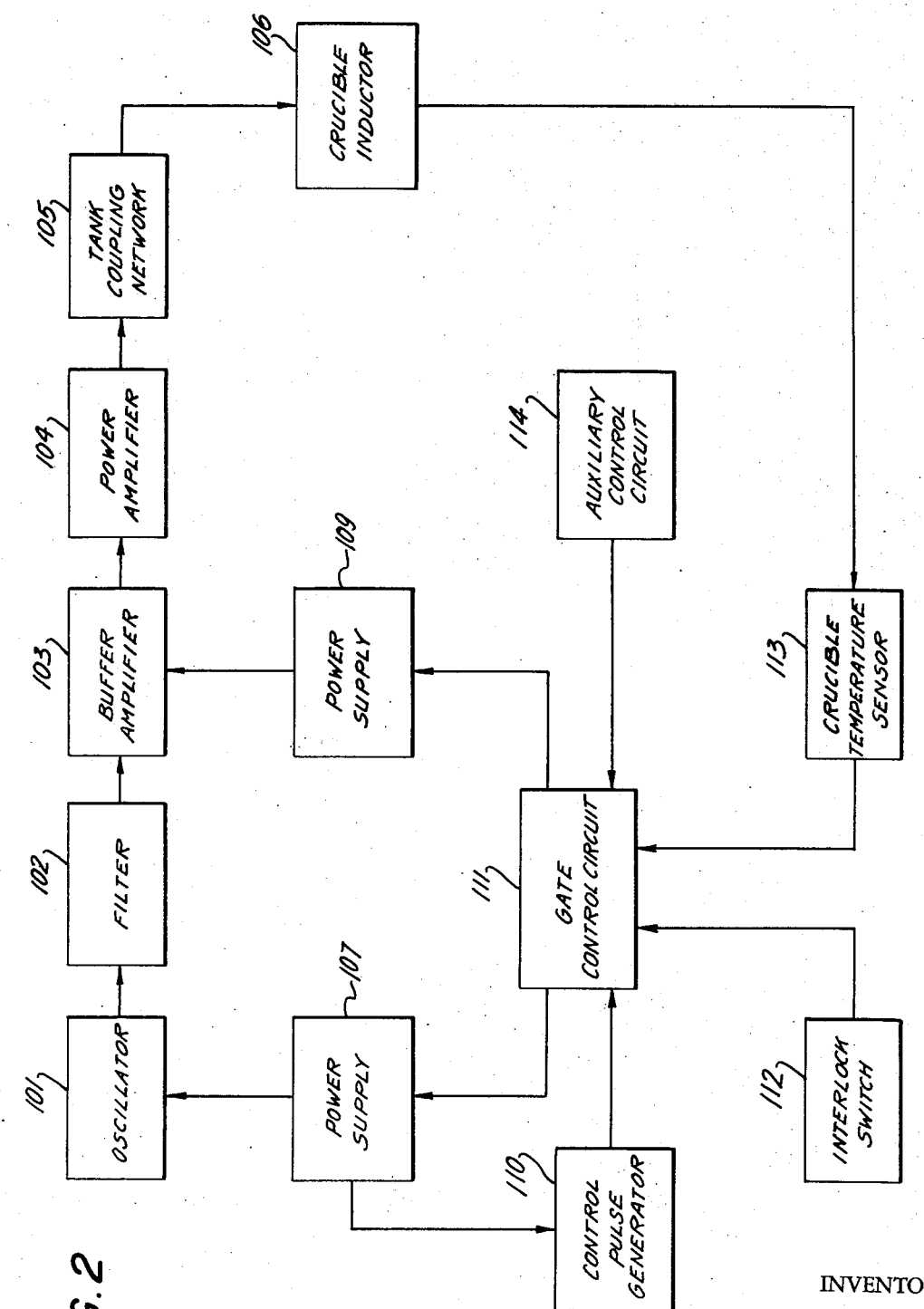
FIG. 2 is a block diagram of another embodiment of FIG. 1 for processing commercial waste.

The arrangement of FIG. 2 is adapted to the treatment of commercial waste. In this embodiment, an electrical Oscillator 101 transmits an oscillatory signal to a filter 102 which filters out harmonics which may cause television and radio interference. A Buffer Amplifier 103 is connected in series with a Power Amplifier 104 for the purpose of amplifying the oscillatory signals, and to transmit it to a Tank Coupling Network 105. The Network 105 is, in turn, connected to a Crucible Inductor 106 which converts the electrical power into heat for conversion of the waste present within the crucible. A low voltage Power Supply 107 feeds the Oscillator 101, whereas a high voltage Power Supply 109 supplies energy to the Power Amplifier 104. A Gate Control Circuit 111 transmits actuating signals to the Power Supply 107 and 109. The Gate 111 is, in turn, operated by signals from the Control Pulse Generator 110. The Gate Circuit 111 may be in the form of a thyratron type of device or solid state transistor A System Interlock Switch 112 insures that the system will not operate unless access doors to the crucible are closed. A Temperature Sensor 113 measures the crucible temperature and inhibits the transmission of pulses from the Gate 111 when the temperature exceeds a predetermined level. Auxiliary Control Circuits 114 serve to prevent opening of the access doors of the crucible until the temperature therein has dropped to a predetermined safe level, in preparation for the next loading cycle.

In operation of the system of FIG. 2 the compacted mass of waste is inserted into the crucible through the access doors thereof. Upon closing of the access doors, the safety Interlock Switch 112 also becomes closed. After a suitable time delay which allows the compacted mass to "set" in the crucible, the Gate 111 is actuated. The actuation of the Gate, in turn, transmits signal to the Power Supply 107 and 109 and hence to the Oscillator 1, and Amplifiers 103 and 104. After filtering the signal from the Oscillator, within the Filter Network 102, the filter signal is amplified and transmitted to the Crucible Inductor 106, via the tank Network 105. The amplified signal is there converted into a burst of heat energy to convert the contents of the crucible. The contents of the crucible are raised to a sufficiently high temperature so that all organic matter is broken down to steam vapor, and gases which are vented out. The residual contents are composed of molten glass, combined with molten metal depending on the original contents of the compacted mass. The molten "slag" mixture is allowed to flow out of the crucible during and after the heat burst cycle. The slag is allowed to flow into a suitable mold receptacle, where the slag is allowed to cool and may be periodically removed. The slag is a by-product which may be used in the construction field as well as for land fill. The residue composition varies as a function of the original contents of the compacted mass. Should this mass be completely organic, substantially no solid residues will prevail.

Figure 3:
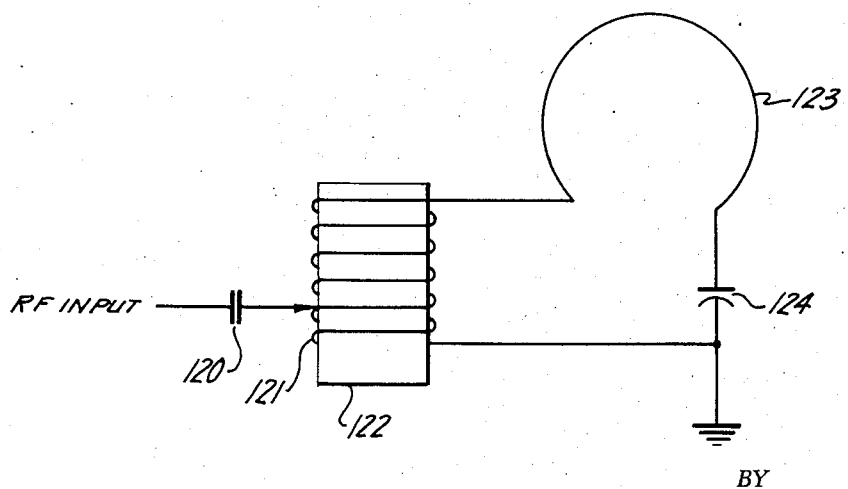
FIG. 3 is an electrical schematic diagram of the electromagnetic circuit for converting electromagnetic energy into heat for decomposition of waste, in accordance with the present invention.

FIG. 3 shows the details of the electrical circuitry for accomplishing the heating of the crucible. The radio frequency signal from the power amplifier is applied to a Coupling Capacitor 120 which is connected to the Crucible Inductor Coil 121. From this junction on the Inductor Coil 121 high frequency currents flow to ground potential. The electromagnetic field generated thereby produces induced radio frequency voltage thru the inductor, and the electrostatic tuned Loop Element 4. This L-C Circuit is tuned to operating frequency of the Oscillator. A Resonating Capacitor 124 is connected in series with the Loop 123. The electromagnetic energy from the Coil 121 is converted into heat through the electrical resistance inherent in the crucible. The crucible itself may be made of sintered metal compounds in which the principal ingredient is sintered iron powder mixed with suitable binding agents molded under high pressure to the required shape and then heated to drive off organic matter.

Raw human waste may be treated in two heat cycles in sequence. The first heat cycle is at relatively lower temperature and drives off the water. The second heat energy burst is at substantially higher temperature and reduces the remaining organic residue to inorganic salts which are dissolved and flushed subsequently. The drainage contains no organic matter after this procedure. To facilitate cleaning and maintenance, the heat crucible may have a fraction-fitted receptacle made of the same alloyed metal as the heat crucible. This receptacle may then be removed for purposes of cleaning and maintenance. A battery supply may be provided to assure operation even in the event of power failure, from a utility supply.

Pollution Control Systems, according to the invention herein described, uses a variable time width pulse controlled, Continuous Wave Radio Frequency Generator, which is coupled to a shunt fed Radio Frequency Power Amplifier, the frequency range of both, in combination, being substantially from 50 KHz through 30 mega Hz. The signal from the Oscillator may be continuous wave, single side band, double side band, also tone modulated. The output of the RF Power Amplifier is electrically coupled to an inductor, which may be tuned to the operating frequency, or not, as need demands. The inductor in turn surrounds a crucible, which is made of sintered metal compounds, or alloy metals. These crucibles are inherently resistive to the flow of Radio Frequency currents, which are induced in them by virtue of the tuned, or untuned inductors, which surround them. The crucibles are an electrically integral part of the overall circuit.

The overall results of the invention, are that Radio Frequency energy is converted to heat energy, at the crucible, and that the time lengths of the heat cycle, and temperature levels of the crucible, are predictable, controllable and safe.

While the invention has been described and illustrated with respect to certain preferred embodiments, it will be understood by those skilled in the art after understanding the principle of the invention, that various other changes and modifications may be made without departing from the spirit of the invention.

What is claimed is:

1. A pollution control method for decomposing waste in a ferromagnetic crucible, said crucible being linked to an electromagnetic field and an electrostatic field generated by a conductive loop with series-connected capacitor, said loop and said capacitor forming a tuned L-C circuit, comprising the steps of collecting waste to be decomposed in said crucible, registering the time instant at which said waste is in ready state for decomposition and conversion; applying radio frequency tuned to said L-C circuit to said loop to maintain said electromagnetic field; converting said electromagnetic energy into heat at said crucible and heating said crucible for decomposing the contents of said crucible; venting gases from said crucible resulting from said heating step; and removing solid residue from said crucible.

2. The method as defined in claim 1 including the step of compacting said waste prior to collecting in said crucible.

* * * * *